United States Patent
Brandwine

(10) Patent No.: US 8,789,176 B1
(45) Date of Patent: Jul. 22, 2014

(54) DETECTING SCANS USING A BLOOM COUNTER

(75) Inventor: Eric J. Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 419 days.

(21) Appl. No.: 13/041,772

(22) Filed: Mar. 7, 2011

(51) Int. Cl.
*H04L 29/06* (2006.01)

(52) U.S. Cl.
USPC ............... 726/22; 726/26; 713/182; 713/188

(58) Field of Classification Search
CPC .......................... H04L 63/1416; G06F 21/10
USPC ........................................................ 726/22
See application file for complete search history.

(56) References Cited

U.S. PATENT DOCUMENTS

| | | | | |
|---|---|---|---|---|
| 7,284,272 B2* | 10/2007 | Howard et al. | ................. | 726/22 |
| 7,487,541 B2* | 2/2009 | Robert | ............................ | 726/22 |
| 7,639,611 B2* | 12/2009 | Hao et al. | ...................... | 370/230 |
| 8,259,585 B1* | 9/2012 | S P et al. | ....................... | 370/237 |
| 8,286,239 B1* | 10/2012 | Sutton | ............................. | 726/22 |
| 2004/0015582 A1* | 1/2004 | Pruthi | ........................... | 709/224 |
| 2004/0199793 A1* | 10/2004 | Wilken et al. | ................ | 713/201 |
| 2006/0098585 A1* | 5/2006 | Singh et al. | ................... | 370/252 |
| 2006/0206571 A1* | 9/2006 | Kuwahara | ..................... | 709/206 |
| 2006/0230456 A1* | 10/2006 | Nagabhushan et al. | ........ | 726/25 |
| 2008/0123545 A1* | 5/2008 | Watanabe et al. | ............. | 370/252 |
| 2008/0271146 A1* | 10/2008 | Rooney et al. | .................. | 726/23 |
| 2009/0046581 A1* | 2/2009 | Eswaran et al. | .............. | 370/230 |
| 2009/0316590 A1* | 12/2009 | Lund et al. | .................... | 370/252 |
| 2010/0058469 A1* | 3/2010 | Yen et al. | ........................ | 726/22 |
| 2012/0054860 A1* | 3/2012 | Wyschogrod et al. | .......... | 726/22 |
| 2012/0226652 A1* | 9/2012 | Gupta et al. | .................... | 706/52 |

OTHER PUBLICATIONS

C. Leckie, R. K. (2002). A Probabilistic Approach to Detecting Network Scans. IEEE, 359-372.*
Gadge, H., & Patil, A. A. (2008). Port Scan Detection. IEEE.*
Dharmapurikar, S., Krishnamurthy, P., Sproull, T., & Lockwood, J. (2003). Deep Packet Inspection using Parallel Bloom Filters. Proceedings of the 11th Symposium on High Performance Interconnects, IEEE, 1-8.*
"*Bloom filter*", Wikipedia, the free encyclopedia, http://en.wikipedia.org/wiki/Bloom_filter, 8 pages.

\* cited by examiner

*Primary Examiner* — Mohammad L Rahman
(74) *Attorney, Agent, or Firm* — Davis Wright Tremaine LLP

(57) ABSTRACT

In certain embodiments, detecting scans may include receiving packets, where each packet has a target. The number of distinct targets of the packets may be counted using one or more Bloom counters. The number of distinct targets may satisfy a scan threshold for detecting a scan. If the scan threshold is satisfied, it is determined a scan is present.

27 Claims, 2 Drawing Sheets

DETECTING SCANS USING A BLOOM COUNTER

BACKGROUND

In a scan, an attacker scans target destinations (such as ports) in order to identify target destinations that may be exploited, for example, may be used to gain unauthorized access. The attacker scans target destinations by sending a message to each target destination. The response from a target destination may indicate whether the target destination can be exploited.

The scanning may occur at any suitable rate. Faster scanning may be easier to detect as the scan traffic may dominate the traffic. In addition, little or no information about the traffic may need to be stored between scan messages. Slower scanning may be more difficult to detect as the scan traffic may hide in the legitimate traffic. In addition, with slower scanning, more traffic information may need to be stored between scan messages.

DESCRIPTION OF EXAMPLE EMBODIMENTS

In a scan, an attacker (which may be a computer system) scans target destinations (such as ports) in order to identify target destinations that may be exploited. The scanning may occur at any suitable rate. In faster scanning, an attacker sends messages to distinct target destinations at a faster rate. Thus, faster scanning may be easier to detect as the scan messages may dominate the traffic. Moreover, little or no traffic information about the target destinations may need to be stored. In slower scanning, an attacker sends messages to multiple target destinations at a slower rate and may even send messages at random times. Thus, slower scanning may be more difficult to detect as the scan traffic may hide in the traffic. In addition, more traffic information about the target destinations may need to be stored.

The traffic information (or state) may be recorded in hash tables in memory. The memory required to record the traffic information, however, is not constant and may be exhausted. For example, an attacker may send a large number of packets to different target destinations in order to exhaust the memory.

Certain embodiments may provide for efficient storage of traffic information, which may allow for better detection of slower (as well as faster) scans. In certain embodiments, a scan detector may include one or more Bloom counters that can count a number of distinct targets of received packets. The scan detector may determine that a scan is present if the number of distinct targets satisfies a scan threshold. A Bloom counter may include a Bloom filter processing unit that may efficiently store and count the number of distinct targets. The Bloom filter processing unit determines whether a target of a packet is an element of a set of distinct targets, and adds the target to the set if the target is not already an element of the set. A counter records the number of elements in the set.

Certain embodiments may analyze any suitable packets. For example, the scan detector may analyze certain types of packets, such as synchronize (SYN) packets. As another example, the scan detector may analyze packets sent from a particular sender, such as a particular instance and/or port. As another example, the scan detector may analyze outbound packets sent from a network and/or inbound packets sent to a network. Certain embodiments allow for the scan detector to analyze any suitable targets, such as source and/or destination Internet Protocol (IP) addresses and/or ports.

Certain embodiments may utilize Bloom counters in any suitable manner. For example, the scan detector may start a second Bloom counter to count distinct targets after a first Bloom counter has been started or after the first Bloom counter has reached a threshold. As another example, the scan detector may start one or more Bloom counters, where each Bloom counter counts for a predetermined time period.

Figure 1:
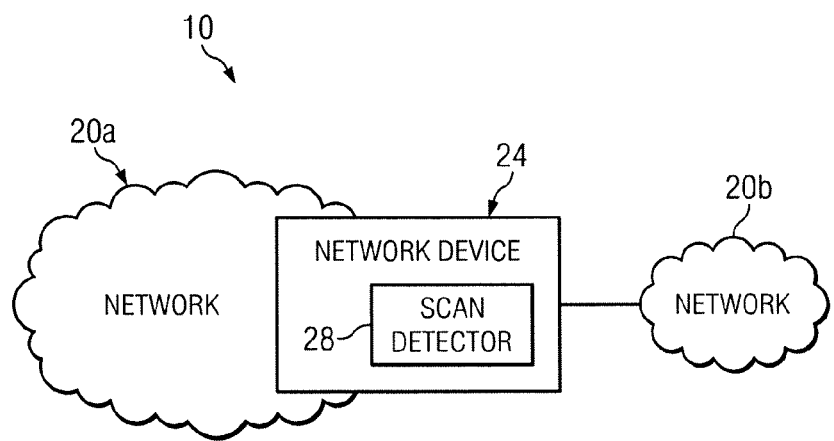
FIG. 1 illustrates an example of a system that includes a scan detector that detects scans according to certain embodiments of the disclosure.

FIG. 1 illustrates an example of a system 10 that includes networks 20 (20a-b) and a network device 24 with a scan detector 28 that can detect scans. In certain embodiments, scan detector 28 uses one or more Bloom counters to detect scans.

In certain embodiments, a communication (or computer) network 20 (20a-b) may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

In certain embodiments, network 20a may be a communication network that is owned, operated by, and/or managed by a particular organization, such as a business, agency, or other organization. In certain embodiments, certain access to network 20a may be limited to authorized users, and network 20a may have a security system that enforces the access. Network 20b may be a communication network that is external to network 20a. In certain embodiments, a user of network 20b may not be allowed certain access to network 20a. In certain embodiments, an attacker of network 20b (or 20a) may perform a scan on network 20a (or 20b).

Network device 24 may connect computers to allow the computers to communicate. Examples of network devices 24 that may include scan detector 28 include a firewall device or other security device. In certain embodiments, network device 24 may be an edge device that may provide entry into network 20a. Examples of edge devices include routers, routing switches, integrated access devices (IADs), multiplexers, and access devices.

Scan detector 28 detects scans. In certain embodiments, scan detector 28 receives packets, and each packet has a target. In the embodiments, scan detector 28 counts a number of distinct targets of the packets using one or more Bloom counters. Bloom counters are described in more detail with reference to FIG. 2. In the embodiments, scan detector 28 determines if the number of distinct targets satisfies a scan threshold for detecting a scan, and determines that a scan is present if the scan threshold is satisfied.

Scan detector 28 may detect inbound and/or outbound scans. In an inbound scan, an attacker external to network 20a scans target destinations internal to network 20a. Scan detector 28 may analyze inbound packets to determine if an attacker is sending scan packets to distinct target destinations in network 20a. In an outbound scan, an attacker internal to network 20a (or an attacker external to network 20a who has taken over a computing system internal to network 20a) scans target destinations external to network 20a. Scan detector 28 may analyze outbound packets to determine if an attacker is sending packets to distinct target destinations outside of network 20a.

In certain embodiments, scan detector 28 may detect anomalous behavior. For example, scan detector 28 may determine if the number of distinct targets satisfies an anomalous behavior threshold for detecting anomalous behavior. Scan detector 28 may determine that anomalous behavior is present if the anomalous behavior threshold is satisfied. In another example, scan detector 28 may determine that the number of distinct targets is different from an expected number of distinct targets, which may be given by historical data. In another example, scan detector 28 may have a set of Bloom counters, each counting different targets. Under normal conditions, the Bloom counters yield similar counts. Accordingly, a Bloom counter that yields a different count may indicate anomalous behavior. The count may be different by a factor with a value in a range of 0.5 to 1, 1 to 2, or greater than 2.

Scan detector 28 may analyze any suitable packets. In certain embodiments, scan detector 28 may analyze all received packets or, in other embodiments, may select a subset of the received packets for analysis. For example, scan detector 28 may analyze certain types of packets, such as synchronize (SYN) packets. As another example, scan detector 28 may sample the received packets to select the subset of packets for analysis. In certain situations, packets may be sampled at a first rate until a scan threshold is reached. Then packets may be sampled at a second rate that is greater than the first rate in order to verify the sampling conducted during the first sampling rate.

Scan detector 28 may analyze targets of packets sent from a sender to detect if the sender is scanning distinct target destinations. In certain embodiments, a target of a packet may be a source or a destination of a packet. Targets may be regarded as distinct if they represent different sources or destinations, respectively. Examples of a target may include a port (such as a Transfer Control Protocol (TCP) or User Datagram Protocol (UDP) port, which may be identified by a port identifier), an address (such an IP address), an instance (which may correspond to a particular user or which may be a virtual or physical host or machine), and a user (which may be identified by a user identifier).

Packets sent from any suitable sender may be analyzed to detect if the sender is scanning any suitable targets. For example, scan detector 28 may analyze packets sent from an instance to detect if the instance is scanning distinct Internet Protocol (IP) addresses. As another example, packets sent from an IP address may be analyzed to detect if the IP address is scanning target ports.

Figure 2:
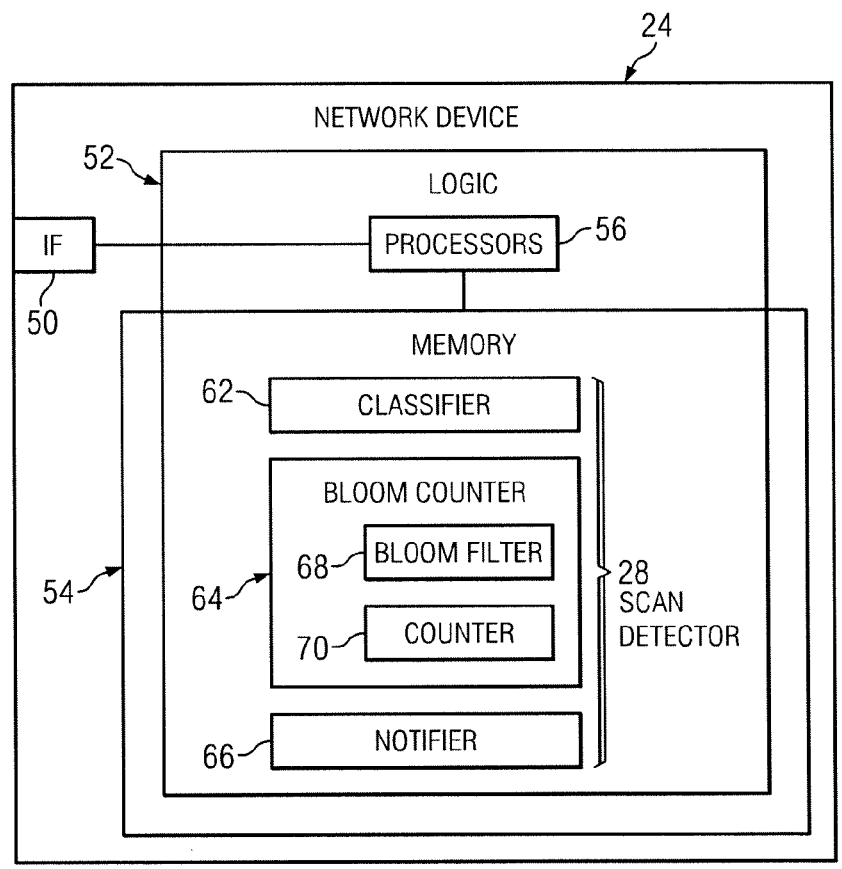
FIG. 2 illustrates an example of a network device that includes the scan detector of FIG. 1 that detects scans using one or more Bloom counters according to certain embodiments of the disclosure.

FIG. 2 illustrates an example of network device 24 that includes scan detector 28 with one or more Bloom counters 64. Network device 24 includes an interface 50, logic 52, and a memory 54. Logic 52 includes one or more processors 56 and applications such as a scan detector 28. Scan detector 28 includes a classifier 62, one or more Bloom counters 64, and a detector 66. A Bloom counter 64 includes a Bloom filter 68 and a counter 70.

Classifier 62 selects packets to be analyzed by scan detector 28 and may select packets in any suitable manner. For example, classifier 62 may select packets with a particular source or destination. The source and/or destination may be expressed as a port identifier, an IP address, a user identifier, and/or an instance identifier. Classifier 62 may include packet matching rules that may be used to select the packets. As another example, classifier 62 may sample packets to be analyzed.

In certain embodiments, a Bloom counter 64 may include a Bloom filter processing unit (such as one or more processors 56), a Bloom filter 68, and a counter 70. In the embodiments, Bloom filter 68 records the elements of a set, such as a set of distinct targets. For a given target of a packet, the Bloom filter processing unit looks to Bloom filter 68 to determine whether the target is an element of the set, and adds the target to the set if the target is not already an element of the set. Counter 70 tracks the number of elements in the set.

Bloom filter 68 may record the elements of a set in any suitable manner and may run in constant time and in constant space. Bloom filter 68 may be any suitable data structure, such as a bit array of m bits. In certain embodiments, Bloom filter 68 is associated with k different hash functions. Each hash function maps a set element to an array position (of the m array positions) with a uniform random distribution. In certain cases, Bloom filter 68 may be initialized such that the m bits are set to 0. To record an element of the set, the Bloom filter processing unit may apply the k hash functions to the element, which yields k array positions, and then set the bits at the k array positions to 1.

The Bloom filter processing unit may determine whether a target is an element of the set in any suitable manner. In certain embodiments, the Bloom filter processing unit applies the k hash functions to the target to yield k target array positions. If the target array positions are already recorded by element array positions of an element, for example, the target array positions correspond to the element array positions, then the target is already an element of the set. For example, if the target is already an element, the bits at the target array positions are set to 1. Thus, if any of the bits at the target array positions are 0, the target is not in the set. If the target is not already an element of the set, the Bloom filter processing unit adds the target to the set, as described above.

If the bits at the target array positions are set to 1, then either the target is in the set, or the bits were set to 1 during the addition of other elements. That is, Bloom filter 68 may yield a false positive by indicating that a target is an element when it is not. Alternatively, a Bloom filter may be regarded as yielding a false negative by indicating that a target is not distinct even though the target is distinct. In certain cases, the errors are acceptable because scans scan a large number of distinct targets, and missing a few targets is unlikely to affect the results. In certain situations, despite the possibility that Bloom filters may yield an error, a Bloom filter may be used to determine whether a target is an element as disclosed herein.

In certain situations, the probability of false positives decreases as number of bits m in the array increases, and increases as the number of added elements n increases. The number of hash functions k that minimizes the probability of false positives may be approximated as 0.7 m/n. If an optimal number of hash functions k is used, the number of bits m in the array that yields a desired probability of false positives p may be estimated according to:

$$m = -\frac{n \ln p}{(\ln 2)^2}$$

Accordingly, more (or less) accuracy may be obtained by selecting Bloom filter 68 with more (or fewer) number of bits m.

In certain embodiments, a hash function may be sliced to yield multiple smaller hashes. For example, a Bloom filter may be 1024 bits long with 10 bits to index and may require six hashes. A single message-digest algorithm 5 (MD5) provides 128 bits. Ten of the 128 bits may be sliced off to yield each of the hashes.

In certain instances, different IP addresses may be associated with a particular instance (such as a customer instance). Accordingly, scan detector 28 may determine if a set of IP addresses are associated with the one instance, and if they are the set of IP addresses may be considered a single target.

Counter 70 tracks the number of elements in the set of distinct targets in any suitable manner. In certain embodiments, counter 70 comprises an integer counter that is incremented each time an element is added to the set.

Scan notifier 66 determines if a scan is present (for example, is occurring or has occurred). For example, scan notifier 66 may determine if the number of distinct targets satisfies a scan threshold for a scan and may determine that a scan is present if the scan threshold is satisfied. As another example, scan notifier 66 may compare a scan ratio of the number of outbound packets to the number of distinct targets to a scan ratio threshold determine the type of attack.

A threshold indicates a point at which a determination is made. In certain embodiments, a scan threshold may indicate the number of distinct targets at which a scan may be regarded as occurring. For example, the expected number of distinct targets when an attack is not occurring may be x. The scan threshold may be expressed as a function of x, for example, as a number greater than x. In certain embodiments, the scan threshold may be satisfied if the number of distinct targets counted by scan detector 28 is greater than the scan threshold. In certain embodiments, the scan threshold may be a rate, such as the number of distinct targets per unit time. The rate may be expressed as a function of x, as described previously. The scan threshold may be satisfied if the number of distinct targets counted by scan detector 28 per unit time is greater than the rate. An anomalous behavior threshold may be similar to a scan threshold.

In certain embodiments, a scan threshold may be dynamically determined. For example, the expected number of distinct targets x may determined from a measured average of currently operating devices, and a scan threshold expressed as a function of x may be calculated from x. In certain embodiments, one or more thresholds may be used. For example, scan thresholds may be time dependent such that different scan thresholds are used for different times of the day, month, year, or other time period.

In certain embodiments, a scan ratio threshold may indicate a type of attack. For example, a scan ratio may be the number of outbound packets to the number of distinct targets. A scan ratio greater than a scan ratio threshold may indicate one type of attack (such as brute force or denial of service attack), and a scan ratio less than the scan ratio threshold may indicate another type of attack (such as scan).

Any suitable number of Bloom counters 64 and/or other counters may be used to count distinct targets in any suitable manner. In certain embodiments, different counters may be started at different times. In certain cases, a Bloom counter may be started after another counter has already been started. For example, a first counter may count packets sent by a particular sender (such as a port) and may determine that the number of packets exceeds a threshold. A second counter (such as a Bloom counter) may count the number of distinct targets (such as distinct destination or source IP addresses) of the port.

In certain embodiments, Bloom counters 64 may be started periodically. For example, a new Bloom counter 64 may be started at each time period, where a time period may have a value that is in the range of less than an hour, one to two hours, or two to ten hours. A counter 64 may stop counting as a new counter is started, or may continue counting even after the new counter 64 has started. For example, a new Bloom counter 64 may be started every hour and may count for three hours.

In certain embodiments, Bloom counters 64 may count for predetermined time periods to yield a time period count that indicates the number of distinct targets counted during the time period. The predetermined time period may be the same for each Bloom counter 64 or may be different for two or more different Bloom counters 64. For example, there may be a first Bloom counter that counts for an hour, a second Bloom counter 64 that counts for 1 day, and a third Bloom counter that counts since an instance was launched. Statistics (such as an average) may be calculated from the time period counts by application a statistical function to the time period counts.

One or more Bloom counters 64 may count targets at any suitable point of network 20a. In certain embodiments, a Bloom counter may be assigned to count targets at a particular point. For example, a Bloom counter 64 may be assigned to count targets (such as IP addresses) for a particular network point (such as a particular port). Different Bloom counters may count different targets. For example, a first Bloom counter 64 may count first targets, and a second Bloom counter 64 may count second targets.

Figure 3:
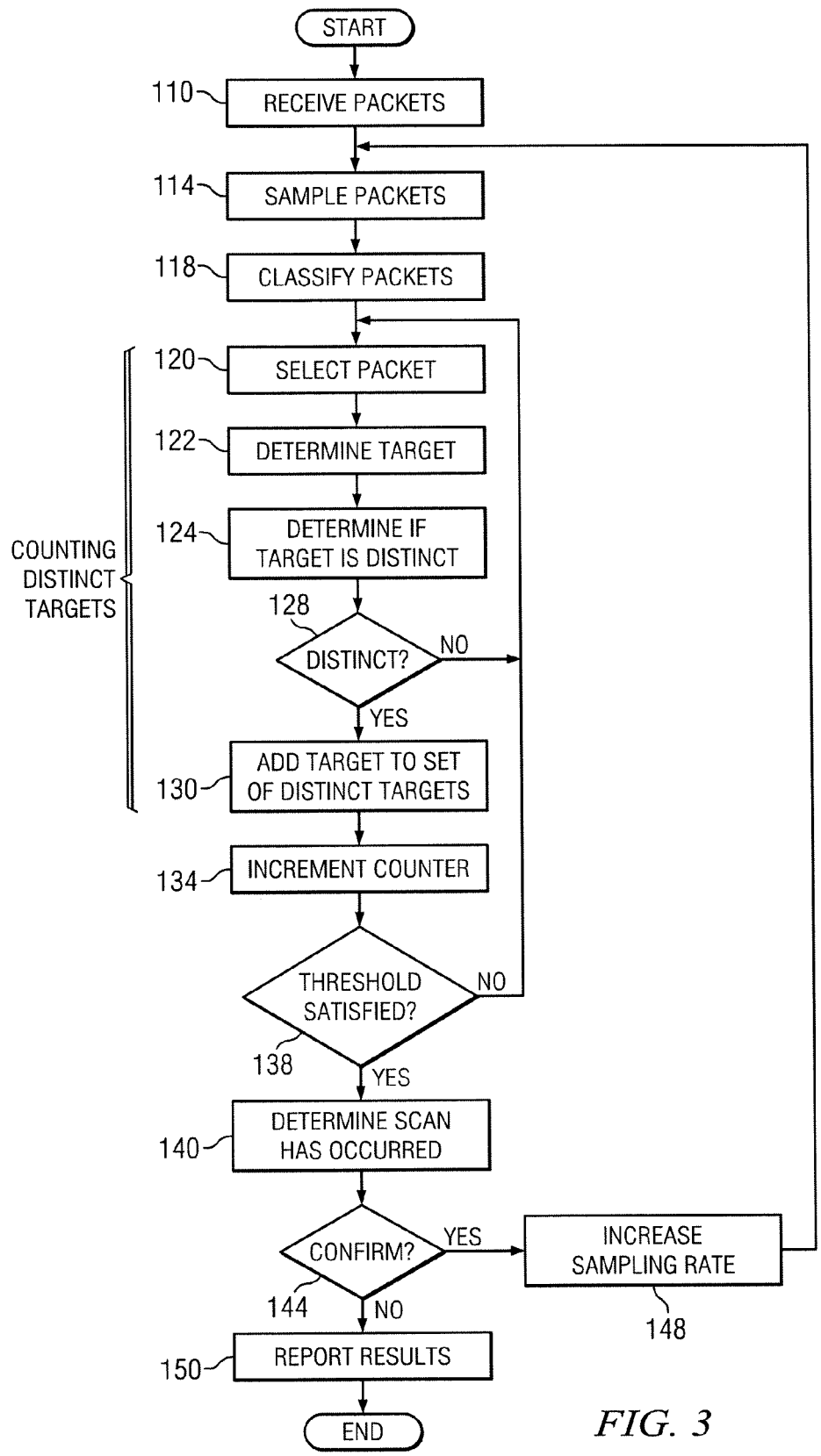
FIG. 3 illustrates an example of a method for detecting scans using one or more Bloom counters that may be used by the scan detector of FIG. 1 according to certain embodiments of the disclosure.

FIG. 3 illustrates an example of a method for detecting scans using one or more Bloom counters. In certain embodiments, scan detector 28 may perform certain steps of the method.

An initial plurality of packets is received at step 110. Each packet has a target. The initial packets are sampled at step 114. The packets are classified at step 118 to select packets for analysis. In certain embodiments, classifier 62 may select the packets.

Steps 120 through 134 describe counting a number of distinct targets using one or more Bloom counters. A packet is selected at step 120. The target is determined at step 122. The target may be, for example, a source and/or destination port and/or address. Bloom counters determine whether a target of a packet is an element of a set of distinct targets at step 124. In certain embodiments, a Bloom counter applies hash functions to the target to yield target array positions, and determines if the target array positions correspond to element array positions representing elements that are already in the set. If they correspond, the target is already an element of the set and is not distinct. If not, then the target is not an element and is thus distinct.

The target may be distinct at step 128. If the target is not distinct, the method returns to step 120 to select another packet. If the target is distinct, the method proceeds to step 130. The target is added to the set of distinct targets at step 130. In certain embodiments, the target is added by recording the target array positions as element array positions. The counter is incremented at step 134.

The number of distinct targets may satisfy a scan threshold for detecting a scan at step 138. If the threshold is not satisfied, the method returns to step 120 to select the next packet. If the threshold is satisfied, the method proceeds to step 140. Scan detector 28 determines that a scan has occurred at step 140.

A confirmation process may be performed at step 144. If a confirmation process is to be performed, the method moves to step 148, where sampling rate may be increased to sample more packets. If the confirmation process is not to be performed, the method proceeds to step 150, where results are reported. Results may be reported by outputting the results on a interface device.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of Bloom counters 64 and notifier 66 may be performed by one component, or the operations of Bloom counters 64 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor (or processing unit) include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory (or memory unit) stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
   one or more interfaces of an edge device of a computer network, the one or more interfaces operable to:
      receive a plurality of packets, each packet of the plurality of packets having a target; and
   one or more processing units of the edge device, the one or more processing units operable to:
      access a Bloom filter comprising an array and associated with a plurality of hash functions, the plurality of hash functions mapping an element of a set of distinct targets to a plurality of element array positions;
      perform the following for one or more packets of the plurality of packets using one or more Bloom counters, at least a subset of the one or more Bloom counters counting for a predetermined time period to yield a time period count:
         determine whether a target of a packet is an element of the set of distinct targets recorded in the Bloom filter; and
         if the target is not an element of the set of distinct targets, add the target to the set of distinct targets;
      determine if a number of distinct targets in the set of distinct targets satisfies a scan threshold for detecting a scan; and
      determine that a scan is present if the scan threshold is satisfied.

2. The system of claim 1, the one or more processing units operable to:
   determine whether a target of a packet is an element of the set of distinct targets by:
      applying the hash functions to the target to yield a plurality of target array positions; and
      determining if the plurality of target array positions are recorded by a plurality of element array positions; and
   if the target is not an element of the set of distinct targets, add the target to the set of distinct targets by recording the plurality of target array positions as a plurality of element array positions.

3. The system of claim 1, at least a subset of the one or more Bloom counters configured to:
   count the number of elements added to the set of distinct targets.

4. The system of claim 1, the packets comprising a packet selected from a group consisting of:
   an outbound packet sent from the computer network; and
   an inbound packet sent to the computer network.

5. A computer-implemented method comprising:
   receiving, by one or more processing units, a plurality of packets, each packet of the plurality of packets having a target;
   counting, by the one or more processing units, a number of distinct targets of the plurality of packets using one or more Bloom counters, at least a subset of the one or more Bloom counters counting for a predetermined time period to yield a time period count;

determining, by the one or more processing units, if the number of distinct targets satisfies a scan threshold for detecting a scan; and determining, by the one or more processing units, that a scan is present if the scan threshold is satisfied.

6. The method of claim 5, the counting the number of distinct targets further comprising:
determining whether a target of a packet is an element of a set of distinct targets recorded in a Bloom filter; and
if the target is not an element of the set of distinct targets, adding the target to the set of distinct targets by recording the target in the Bloom filter.

7. The method of claim 5, the counting the number of distinct targets further comprising:
accessing a Bloom filter comprising an array and associated with a plurality of hash functions, the plurality of hash functions mapping an element of a set of distinct targets to a plurality of element array positions;
determining whether a target of a packet is an element of the set of distinct targets by:
applying the hash functions to the target to yield a plurality of target array positions; and
determining if the plurality of target array positions are recorded by a plurality of element array positions; and
if the target is not an element of the set of distinct targets, adding the target to the set of distinct targets by recording the plurality of target array positions as a plurality of element array positions.

8. The method of claim 5, the counting the number of distinct targets further comprising:
counting a number of elements added to a set of distinct targets recorded in a Bloom filter.

9. The method of claim 5, further comprising:
receiving an initial plurality of packets; and
sampling the initial packets to yield the plurality of packets.

10. The method of claim 5, further comprising confirming a scan detection by:
determining that the scan threshold has been satisfied;
increasing a sample rate to sample a plurality of additional packets; and
counting the number of distinct targets of the plurality of additional packets.

11. The method of claim 5, the packets comprising a packet selected from a group consisting of:
a synchronize packet;
a packet sent from an instance;
a packet sent from a port;
an outbound packet sent from a network; and
an inbound packet sent to a network.

12. The method of claim 5, the target comprising a target selected from a group consisting of:
a destination Internet Protocol address;
a source Internet Protocol address;
a destination User Datagram Protocol port;
a source User Datagram Protocol port;
a destination Transmission Control Protocol port; and
a source Transmission Control Protocol port.

13. The method of claim 5, the target comprising a destination from a given source.

14. The method of claim 5, the counting the number of distinct targets further comprising:
starting a second Bloom counter to count the number of distinct targets after a first Bloom counter has been started.

15. The method of claim 5, the counting the number of distinct targets further comprising:
starting a second Bloom counter to count the number of distinct targets after a first Bloom counter has reached a threshold.

16. The method of claim 5, the counting the number of distinct targets of the plurality of packets using the one or more Bloom counters further comprising starting one or more of the one or more Bloom counters.

17. The method of claim 5, the counting the number of distinct targets of the plurality of packets using the one or more Bloom counters further comprising:
starting one or more of the one or more Bloom counters; and applying a statistical function to the time period counts.

18. The method of claim 5, the counting the number of distinct targets further comprising:
starting a first Bloom counter to count the distinct targets; and
starting a second Bloom counter to count a plurality of other distinct targets.

19. The method of claim 5, the determining if the number of distinct targets satisfies a scan threshold further comprising:
counting a number of packets; and
if a ratio of the number of packets to a number of distinct targets satisfies a scan ratio threshold, determining that the scan is present.

20. One or more non-transitory computer-readable media comprising logic, the logic when executed by one or more processing units operable to perform operations comprising:
receiving a plurality of packets, each packet of the plurality of packets having a target;
accessing a Bloom filter comprising an array and associated with a plurality of hash functions, the plurality of hash functions mapping an element of a set of distinct targets to a plurality of element array positions;
determining whether a target of a packet is an element of the set of distinct targets by:
applying the hash functions to the target to yield a plurality of target array positions; and
determining if the plurality of target array positions are recorded by a plurality of element array positions;
if the target is not an element of the set of distinct targets, adding the target to the set of distinct targets by recording the plurality of target array positions as a plurality of element array positions;
counting a number of distinct targets of the set of distinct targets using one or more Bloom counters, at least a subset of the one or more Bloom counters counting the number of distinct targets for a predetermined time period to yield a time period count;
determining if the number of distinct targets satisfies a scan threshold for detecting a scan; and
determining that a scan is present if the scan threshold is satisfied.

21. The media of claim 20, the operations further comprising:
counting the number of distinct targets of the set of distinct targets;
determining if the number of distinct targets satisfies an anomalous behavior threshold for detecting anomalous behavior; and
determining that anomalous behavior is present if the anomalous behavior threshold is satisfied.

22. The media of claim 20, the operations further comprising:
  starting a second Bloom counter to count the number of distinct targets after a first Bloom counter has been started.

23. The media of claim 20, the operations further comprising:
  starting a second Bloom counter to count the number of distinct targets after a first Bloom counter has reached a threshold.

24. The media of claim 20, the operations further comprising:
  starting one or more Bloom counters, at least a subset of the one or more Bloom counters counting the number of distinct targets for a predetermined time period.

25. One or more non-transitory computer-readable media comprising logic, the logic when executed by one or more processing units operable to perform operations comprising:
  receiving a plurality of packets, each packet of the plurality of packets having a target;
  accessing a Bloom filter comprising an array and associated with a plurality of hash functions, the plurality of hash functions mapping an element of a set of distinct targets to a plurality of element array positions;
  determining whether a target of a packet is an element of the set of distinct targets by:
    applying the hash functions to the target to yield a plurality of target array positions; and
    determining if the plurality of target array positions are recorded by a plurality of element array positions;
  if the target is not an element of the set of distinct targets, adding the target to the set of distinct targets by recording the plurality of target array positions as a plurality of element array positions;
  starting one or more Bloom counters, at least a subset of the one or more Bloom counters counting a number of distinct targets for a predetermined time period to yield a time period count; and
  applying a statistical function the time period counts.

26. The media of claim 20, the counting the number of distinct targets using one or more Bloom counters further comprising:
  starting a first Bloom counter to count the distinct targets; and
  starting a second Bloom counter to count a plurality of other distinct targets.

27. The media of claim 20:
  the counting the number of distinct targets using one or more Bloom counters further comprising:
  configuring at least a subset of the one or more Bloom counters to count a particular type of target; and
    detecting anomalous behavior associated with the particular type of target using one or more of the subset of the one or more Bloom counters.

* * * * *